United States Patent
Sultenfuss et al.

(10) Patent No.: US 12,401,236 B2
(45) Date of Patent: Aug. 26, 2025

(54) SYSTEMS AND METHODS FOR ALIGNING AN ELECTRONIC DEVICE WITH RESPECT TO A WIRELESS CHARGING PAD DISPOSED UNDER A WORK SURFACE

(71) Applicant: Dell Products, L.P., Round Rock, TX (US)

(72) Inventors: Andrew Thomas Sultenfuss, Leander, TX (US); Anthony J. Sanchez, Pflugerville, TX (US); Andrew P. Tosh, Austin, TX (US); Laurent A. Regimbal, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 804 days.

(21) Appl. No.: 17/645,761

(22) Filed: Dec. 23, 2021

(65) Prior Publication Data
US 2023/0208210 A1    Jun. 29, 2023

(51) Int. Cl.
*H02J 50/90* (2016.01)
*H02J 7/00* (2006.01)
*H02J 50/10* (2016.01)
*H02J 50/40* (2016.01)
*A47B 13/16* (2006.01)

(52) U.S. Cl.
CPC ............ *H02J 50/90* (2016.02); *H02J 7/0047* (2013.01); *H02J 50/10* (2016.02); *H02J 50/402* (2020.01); *A47B 13/16* (2013.01)

(58) Field of Classification Search
CPC ...................................................... H02J 50/90
USPC ........................................................... 320/109
See application file for complete search history.

(56) References Cited

U.S. PATENT DOCUMENTS

| | | | |
|---|---|---|---|
| 8,854,224 B2* | 10/2014 | Kirby | H02J 50/80 340/870.37 |
| 11,984,739 B1* | 5/2024 | Smith | H02J 7/00034 |
| 2010/0201533 A1* | 8/2010 | Kirby | H02J 7/0047 320/108 |
| 2013/0076308 A1* | 3/2013 | Niskala | H02J 7/00 320/108 |
| 2014/0054961 A1* | 2/2014 | Metcalf | H02J 7/00034 307/19 |
| 2017/0331319 A1* | 11/2017 | Nitz | H02J 7/0071 |
| 2019/0027975 A1* | 1/2019 | Plasmans | G06Q 10/10 |
| 2020/0227942 A1* | 7/2020 | Jung | A47B 21/06 |
| 2020/0235597 A1* | 7/2020 | Hakla | H02J 50/80 |
| 2024/0097739 A1* | 3/2024 | Leabman | H02J 50/80 |

FOREIGN PATENT DOCUMENTS

KR 200482258 Y1 * 5/2024 ............ H01M 10/46

* cited by examiner

*Primary Examiner* — Jerry D Robbins
(74) *Attorney, Agent, or Firm* — Fogarty LLP

(57) ABSTRACT

Systems and methods for aligning an electronic device to a wireless charging pad disposed under a work surface are described. In some embodiments, a system may include a printed circuit board (PCB) and a light indicator coupled to the PCB, where the light indicator is configured to connect to a wireless charging pad disposed under a work surface, and where light emitted by the light indicator is visible to a user from above the work surface.

18 Claims, 15 Drawing Sheets

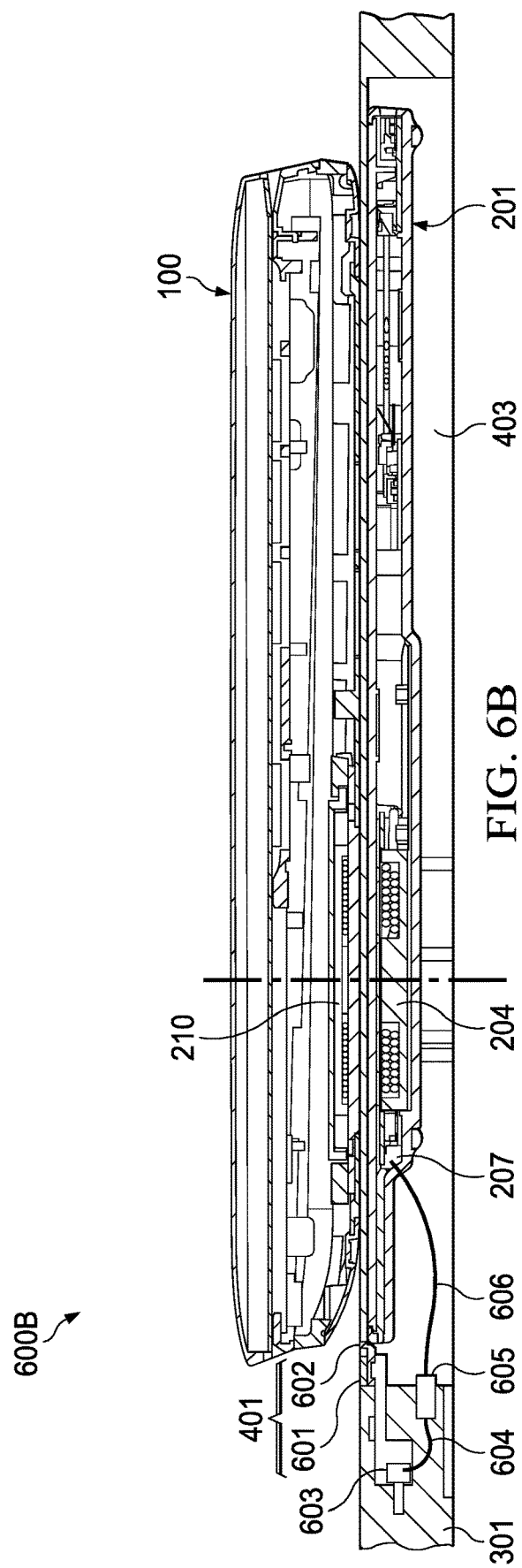

SYSTEMS AND METHODS FOR ALIGNING AN ELECTRONIC DEVICE WITH RESPECT TO A WIRELESS CHARGING PAD DISPOSED UNDER A WORK SURFACE

FIELD

This disclosure relates generally to Information Handling Systems (IHSs), and more specifically, to systems and methods for aligning an electronic device with respect to a wireless charging pad disposed under a work surface.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

A wireless power delivery system typically includes a wireless charging pad upon which an IHS may be placed for charging. The IHS can communicate with the pad via near field communication (NFC) to indicate that the IHS available to receive power. The wireless power delivery system can then wirelessly transmit power to the IHS, for example, to charge an internal battery of the IHS.

SUMMARY

Embodiments of systems and methods for aligning an electronic device with respect to a wireless charging pad disposed under a work surface are described herein. In an illustrative, non-limiting embodiment, a system may include a printed circuit board (PCB) and a light indicator coupled to the PCB, where the light indicator is configured to connect to a wireless charging pad disposed under a work surface, and where light emitted by the light indicator is visible to a user from above the work surface.

The light indicator may include a Light Emitting Diode (LED). The light indicator may be configured to connect to a General-Purpose Input/Output (GPIO) pin of the wireless charging pad. The work surface may be part of a desk or table. The work surface may be opaque, and the light may be visible through a slot on the work surface. The wireless charging pad may be mounted onto the desk or table using a support piece coupled to an underside of the work surface.

The system may also include a protruding alignment bar configured to facilitate alignment of an electronic device atop the work surface with respect to the wireless charging pad in a first direction. The protruding alignment bar may be configured to catch a leading edge of the electronic device in response to the electronic device being moved toward an edge of the work surface nearest the user. The first direction may be at an angle between 0 and 45° with respect to the edge. The light indicator may be configured to provide a visual indication to the user that the electronic device is aligned with respect to the wireless charging pad in a second direction perpendicular to the first direction.

The electronic device may be aligned with respect to the wireless charging pad when a receive (Rx) coil(s) of the electronic device is positioned relative to a transmit (Tx) coil(s) of the wireless charging pad and electromagnetic energy is transferred between the Tx and Rx coil(s). The Tx coil(s) may include two or more coil(s) separated by a distance in the first direction. Each of the two or more coil(s) may include a racetrack shape.

The light indicator may be configured to provide a second visual indication to the user that the electronic device is misaligned with respect to the wireless charging pad in the second direction. Additionally, or alternatively, the light indicator may be configured to provide a third visual indication to the user that the wireless charging pad is coupled to a power supply. Additionally, or alternatively, the light indicator may be configured to provide a third visual indication to the user of a problem or error.

In another illustrative, non-limiting embodiment, a table or a desk may include a wireless charger coupled to a bottom side of a work surface and an alignment system including: (a) an alignment bar configured to facilitate alignment of an electronic device above the work surface with respect to the wireless charger in a first direction; and (b) a light indicator configured to provide a visual indication to the user that the electronic device is aligned with respect to the wireless charger in a second direction perpendicular to the first direction. The electronic device may be aligned with respect to the wireless charger when an Rx coil(s) of the electronic device is electromagnetically coupled to a Tx coil(s) of the wireless charger.

In yet another illustrative, non-limiting embodiment, a method may include: providing a visual indication to a user that an electronic device is not properly aligned with respect to an induction mat using a light indicator; and providing another visual indication to a user that the electronic device is aligned with respect to the induction mat via the light indicator, where the induction mat is coupled to a bottom side of a work surface, and where the light indicator is visible from a top side of the work surface. The electronic device may be aligned with respect to the induction mat when an Rx coil(s) of the electronic device is electromagnetically coupled to a Tx coil(s) of the induction mat.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIGS. 6A and 6B are diagrams of an example of a light indicator of a wireless charging alignment system, according to some embodiments.

DETAILED DESCRIPTION

Figure 1:
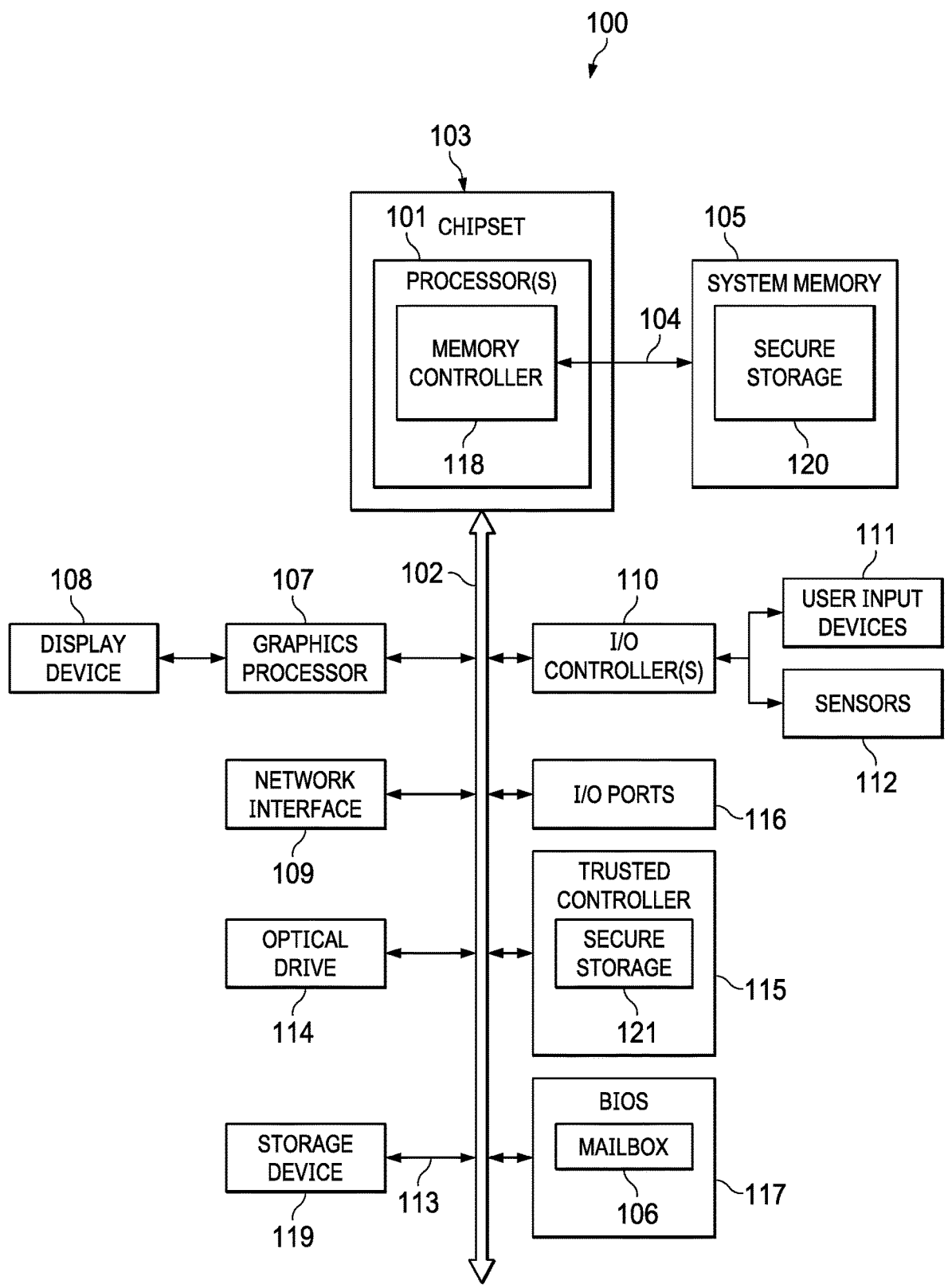
FIG. 1 is a diagram of components of an example of an Information Handling System (IHS), according to some embodiments.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a diagram depicting components of an example IHS 100. As shown, IHS 100 includes one or more processor(s) 101, such as a Central Processing Unit (CPU), operable to execute code retrieved from system memory 105. Although IHS 100 is illustrated with a single processor, other embodiments may include two or more processors, that may each be configured identically, or to provide specialized processing operations.

Processor(s) 101 may include any processor capable of executing program instructions, such as an INTEL PENTIUM series processor or any general-purpose or embedded processors implementing any of a variety of Instruction Set Architectures (ISAs), such as the x86, POWERPC®, ARM®, SPARC®, or MIPS® ISAs, or any other suitable ISA. In the embodiment of FIG. 1, processor(s) 101 includes an integrated memory controller 118 that may be implemented directly within the circuitry of processor(s) 101, or memory controller 118 may be a separate integrated circuit that is located on the same die as processor(s) 101. Memory controller 118 may be configured to manage the transfer of data to and from system memory 105 of IHS 100 via high-speed memory interface 104.

System memory 105 that is coupled to processor(s) 101 via memory bus 104 provides processor(s) 101 with a high-speed memory that may be used in the execution of computer program instructions by processor(s) 101. Accordingly, system memory 105 may include memory components, such as such as static RAM (SRAM), dynamic RAM (DRAM), NAND Flash memory, suitable for supporting high-speed memory operations by processor(s) 101. In some embodiments, system memory 105 may combine both persistent, non-volatile memory and volatile memory.

In certain embodiments, system memory 105 includes secure storage 120 that may be a portion of the system memory designated for storage of information, such as access policies, component signatures, encryption keys, and other cryptographic information, etc. In such embodiments, a signature may be calculated based on the contents of secure storage 120 and stored as a reference signature. The integrity of the data stored in secure storage 120 may then be validated at a later time by recalculating this signature of the contents of the secure storage and comparing the recalculated signature against the reference signature.

IHS 100 utilizes chipset 103 that may include one or more integrated circuits that are coupled to processor(s) 101. In the embodiment of FIG. 1, processor(s) 101 is depicted as a component of chipset 103. In other embodiments, all of chipset 103, or portions of chipset 108 may be implemented directly within the integrated circuitry of processor(s) 101. Chipset 103 provides processor(s) 101 with access to a variety of resources accessible via bus 102. In IHS 100, bus 102 is illustrated as a single element. However, other implementations may utilize any number of buses to provide the illustrated pathways served by bus 102.

As illustrated, a variety of resources may be coupled to processor(s) 101 of IHS 100 through chipset 103. For instance, chipset 103 may be coupled to network interface 109, such as provided by a Network Interface Controller (NIC) that is coupled to IHS 100 and allows IHS 100 to communicate via a network, such as the Internet or a LAN. Network interface device 109 may provide IHS 100 with wired and/or wireless network connections via a variety of network technologies, such as wireless cellular or mobile networks (CDMA, TDMA, LTE etc.), WiFi and BLUETOOTH. In certain embodiments, network interface 109 may support connections between a trusted IHS component, such as trusted controller 115, and a remote orchestration service. In such embodiments, a connection supported by network interface 109 between the remote orchestration service and the trusted component may be considered an out-of-band (OOB) connection that is isolated from an operating system (OS) of the IHS.

Chipset 102 may also provide access to one or more display device(s) 108 via graphics processor 107. In certain embodiments, graphics processor 107 may be comprised within one or more video or graphics cards or an controller installed as components of IHS 100. Graphics processor 107 may generate display information and provide the generated information to one or more display device(s) 108 coupled to IHS 100, where display device(s) 108 may include integrated display devices and/or external display devices coupled to IHS, such as via an I/O port 116, where display device(s) 108 may include integrated display devices and/or external display devices coupled to IHS. In certain embodiments, graphics processor 107 may be integrated within processor 101. The one or more display devices 108 coupled to IHS 100 may utilize LCD, LED, OLED, or other thin film display technologies. Each display device 108 may be capable of touch input such as via a touch controller that may be an embedded component of display device 108, graphics processor 107, or a separate component of IHS 100 accessed via bus 102.

In certain embodiments, chipset 103 may utilize one or more I/O controllers to access hardware components such as user input devices 111 and sensors 112. For instance, I/O controller 110 may provide access to user-input devices 110 such as a keyboard, mouse, touchpad, touchscreen and/or other peripheral input devices. User input devices 111 may interface with I/O controller 110 through wired or wireless connections. Sensors 112 accessed via I/O controllers 110 may provide access to data describing environmental and operating conditions of IHS 100 (e.g., accelerometers, gyroscopes, hinge sensors, rotation sensors, hall effect sensors, temperature sensors, voltage sensors, sensors, IR sensors, photosensors, proximity sensors, distance sensors, magnetic sensors, microphones, ultrasonic sensors, etc.).

In some cases, chipset 103 may include a sensor hub capable of utilizing information collected by sensors 112 in determining the relative orientation and movement of IHS 100. For instance, the sensor hub may utilize inertial movement sensors, that may include accelerometer, gyroscope, and magnetometer sensors, and are capable of determining the orientation and movement of IHS 100 (e.g., IHS 100 is motionless on a relatively flat surface, IHS 100 is being moved irregularly and is likely in transport, the hinge of IHS 100 is oriented in a vertical direction). In certain embodiments, the sensor hub may also include capabilities for determining a location and movement of IHS 100 based on triangulation of network signal and based on network information provided by the OS or network interface 109. In some embodiments, the sensor hub may support additional sensors, such as optical, infrared and sonar sensors, that may provide support for xR (virtual, augmented, and/or mixed reality) sessions hosted by the IHS 100 and may be used by the sensor hub provide an indication of a user's presence near IHS 100, such as whether a user is present, absent, and/or facing integrated display 108.

In cases where the end-user is present before IHS 100, the sensor hub may further determine a distance of the end-user from the IHS, where this determination may be made continuously, at periodic intervals, or upon request. The detected or calculated distances may be used by processor 101 to classify the user as being in the IHS's near-field (user's position<threshold distance A), mid-field (threshold distance A<user's position<threshold distance B, where B>A), or far-field (user's position>threshold distance C, where C>B).

In embodiments where IHS 100 may support multiple physical configurations, such as a convertible laptop, N-in-1 device, or the like, the sensor hub may utilize one or more mode sensors 112 that collect readings that may be used in determining the posture in which IHS 100 is physically configured. In certain embodiments, such posture determinations may be additionally made using the movement and orientation information provided by sensors 112. In laptop and convertible laptop embodiments, for example, processor 101 or trusted controller 115 may utilize a lid position sensor 112 to determine the relative angle between the two panels of the laptop to determine the mode in which IHS 100 is physically configured. In such embodiments, the lid position sensor may measure the angle of rotation of the hinge that connects the base panel and lid panel of IHS 100. In some embodiments, processor 101 or trusted controller 115 may provide collected lid position information, such as the hinge angle, to the sensor hub for use in determining the posture in which IHS 100 is configured. In some embodiments, the sensor hub may interface directly with the lid position sensor in determining hinge angle information.

The sensor hub may determine the posture of IHS 100 based, at least in part, on the angle of rotation of the hinge of IHS 100 from a closed position. A first range of hinge angles from a closed position may indicate a laptop posture, a second range of hinge angles may indicate a landscape posture and a third range of angles may indicate a tablet posture. The sensor hub may additionally utilize orientation and movement information collected from inertial movement sensors 112 to further determine the posture in which IHS 100 is physically configured. For instance, if the sensor hub determines that IHS 100 is configured with a hinge angle of a laptop configuration, but IHS 100 is oriented on its side, the IHS may be determined to be in a book mode. If IHS 100 is determined to be tilted such that the hinge is oriented between horizontal and vertical, the user's face is detected to be facing the integrated display, and IHS 100 is experiencing slight movement, the sensor hub may determine that IHS 100 is being used in a book posture. The sensor hub may determine that IHS 100 is opened to a 180-degree hinge angle and lies on a flat surface, thus indicating that IHS 100 it is being used in a landscape posture. The sensor hub may similarly determine that IHS 100 is in a tent configuration, in response to detecting a hinge angle within a defined range, such as between 300 and 345 degrees, and also detecting an orientation of IHS 100 where the hinge is aligned horizontally and is higher than both of the display panels of IHS 100.

Other components of IHS 100 may include one or more I/O ports 116 for communicating with peripheral external devices as well as various input and output devices. For instance, I/O 116 ports may include HDMI (High-Definition Multimedia Interface) ports for use in connecting external display devices to IHS 100 and USB (Universal Serial Bus) ports, by which a variety of external devices may be coupled to IHS 100. In some embodiments, external devices coupled to IHS 100 via an I/O port 116 may include storage devices that support transfer of data to and from system memory 105 and/or storage devices 119 of IHS 100. Access to storage devices via an I/O port 116 may result in a change in the security profile of IHS 100.

Chipset 103 also provides processor(s) 101 with access to one or more storage devices 119. In various embodiments, storage device 119 may be integral to IHS 100, or may be external to IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In some embodiments, storage device 119 may be a system of storage devices, such as a cloud drive accessible via network interface 109.

As illustrated, IHS 100 also includes BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to IHS 100. Upon execution, BIOS 117 instructions may facilitate the loading of an OS (e.g., WINDOWS, MACOS, iOS, ANDROID, LINUX, etc.) for use by IHS 100. BIOS 117 provides an abstraction layer that allows the OS to interface with the hardware components of IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI.

In the illustrated embodiment, BIOS 117 includes a predefined memory or memory region that may be referred to as NVM (Non-Volatile Memory) mailbox 106. In such an implementation, mailbox 106 may provide a secured storage location for use in storing access policies, signatures, cryptographic keys, or other data. In certain embodiments, BIOS mailbox 106 may be utilized as a secure storage utilized by a remote orchestration service in order to store access policies and cryptographic keys for use in delivering and deploying a secured container on IHS 100. BIOS mailbox 106 and secured storage 120 in system memory 105 may be utilized in this manner instead of, or in conjunction with, out-of-band functions implemented by trusted controller 115.

In certain embodiments, trusted controller 115 is coupled to IHS 100. For example, trusted controller 115 may be an Embedded Controller (EC) that is installed as a component of the motherboard of IHS 100. Trusted controller 115 may be additionally configured to calculate signatures that uniquely identify individual components of IHS 100. In such scenarios, trusted controller 115 may calculate a hash value based on the configuration of a hardware and/or software component coupled to IHS 100. For instance, trusted controller 115 may calculate a hash value based on all firmware and other code or settings stored in an onboard memory of a hardware component, such as a network interface 109. Such hash values may be calculated as part of a trusted process of manufacturing IHS 100 and may be maintained in the secure storage 121 as a reference signature.

Trusted controller 115 may be further configured to recalculate a hash value at a later time for such a component. The hash value recalculated for the component may then be compared against the reference hash value signature to determine if any modifications have been made to a component, thus indicating the component has been compromised. In this manner, trusted controller 115 may be used to validate the integrity of hardware and software components installed on IHS 100.

Trusted controller 115 may also implement operations for interfacing with a power adapter in managing power for IHS 100. Such operations may be utilized to determine the power status of IHS 100, such as whether IHS 100 is operating from battery power or is plugged into an AC power source. Firmware instructions utilized by trusted controller 115 may be used to operate a secure execution environment that may include operations for providing various core operations of IHS 100, such as power management and management of certain modes of IHS 100 (e.g., turbo modes, maximum operating clock frequencies of certain components, etc.).

In managing modes of IHS 100, trusted controller 115 may implement operations for detecting certain changes to the physical configuration of IHS 100 and managing the modes corresponding to different physical configurations of IHS 100. For instance, where IHS 100 is a laptop computer or a convertible laptop computer, trusted controller 115 may receive inputs from a lid position sensor 112 that may detect whether the two sides of the laptop have been latched together to a closed position. In response to lid position sensor 112 detecting latching of the lid of IHS 100, trusted controller 115 may initiate operations for shutting down IHS 100 or placing IHS 100 in a low-power mode.

IHS 100 may support the use of various power modes. In some embodiments, the power modes of IHS 100 may be implemented through operations of trusted controller 115 and/or the OS of IHS 100. In various embodiments, IHS 100 may support different reduced power modes in order to reduce power consumption and/or conserve battery power when IHS 100 is not actively in use, and/or to control a level of performance available to the user by increasing or decreasing a maximum operating clock frequency of a component of IHS 100 (e.g., processor(s) 101).

For example, in some implementations, a low-power mode of operation may include the S0 low-power idle model, also known as Modern Standby or Connected Standby, which provides an instant on/off user experience and maintains a network connection for certain processes while consuming very little power. These power modes may be entered, for example, when IHS 100 transitions into standby (e.g., "sleep," etc.).

In some embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components. For example, all or a portion of the operations executed by the illustrated components may instead be provided by components integrated into processor(s) 101 as systems-on-a-chip. As such, in certain embodiments, IHS 100 may be implemented as different classes of computing devices including, but not limited to: servers, workstations, desktops, laptops, appliances, video game consoles, tablets, smartphones, wearables (e.g., smart watches), etc.

Figure 2:
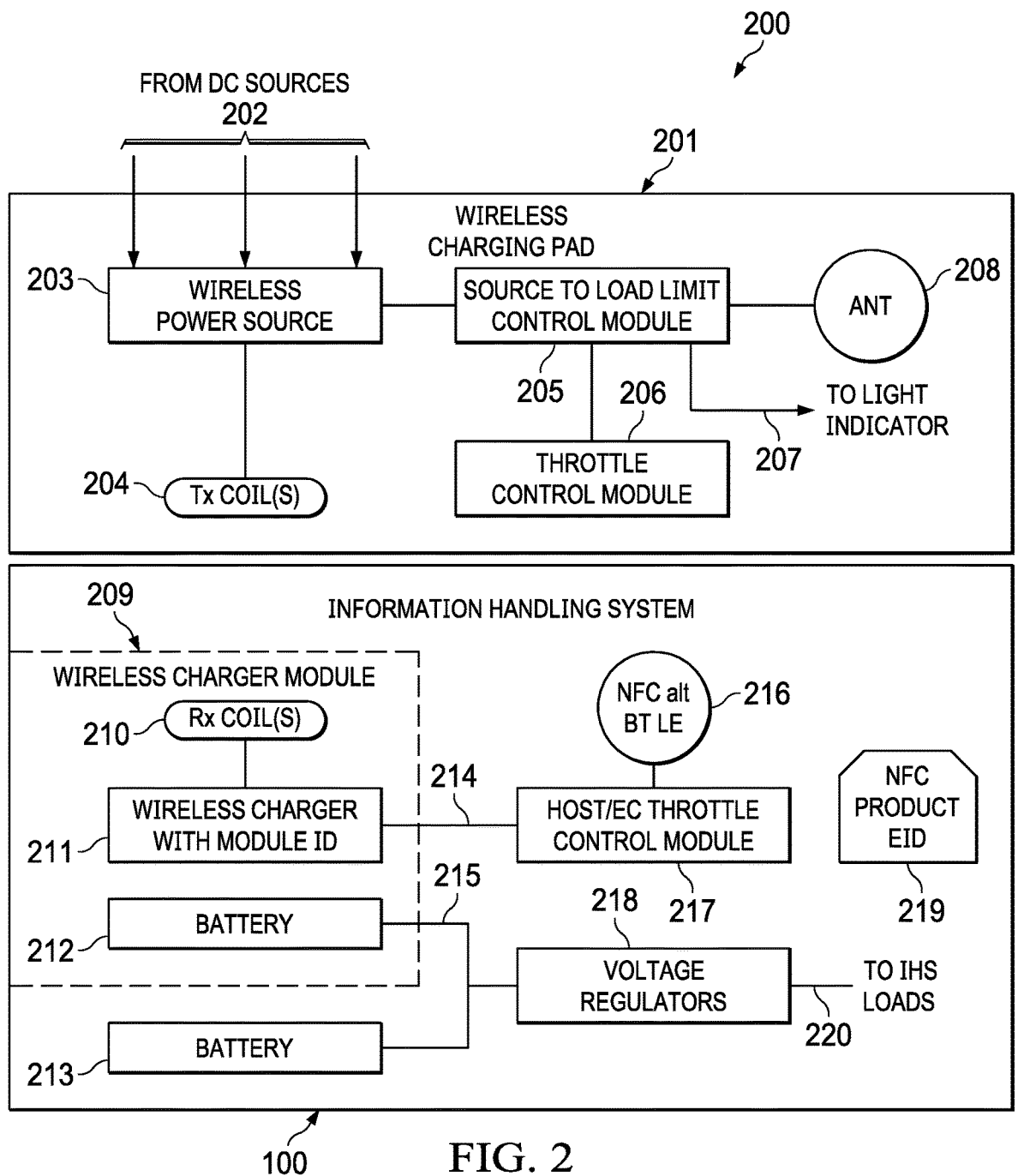
FIG. 2 is a diagram of components of an example of a wireless power delivery system, according to some embodiments.

FIG. 2 shows components of an example of wireless power delivery system 200 including wireless or induction charging pad 201, IHS 100, and a plurality of direct current DC sources 202. Wireless charging pad 201 includes wireless power source 203, and transmit (Tx) coil(s) 204, source-to-load limit control module 205, throttle control module 206, and antenna 208. Particularly, Tx coil(s) 204 is in communication with wireless power source 203. Wireless power source 203 is in communication with source-to-load limit control module 205, which in turn is in communication with throttle control module 206 and with antenna 208.

In this implementation, control module 205 includes output 207 (e.g., a General-Purpose Input/Output or "GPIO" pin, etc.) operable to provide a signal to an indicator light of an electronic device alignment system, as discussed in more detail below.

IHS 100 includes battery 213, voltage regulators 218, host/embedded controller (EC) throttle control module 217, near field communication (NFC) alternative Bluetooth Low Energy (BT LE) antenna 216, and NFC product Electronic Data Identification (EDID) tag 219. Wireless charger module 209 includes battery 212, receive (Rx) coil(s) 210, and wireless charger with module ID 211. Specifically, Rx coil(s) 210 is in communication with wireless charger 211, which in turn is in communication with host/EC throttle control module 217 via communication bus 214. Wireless charger 211 is also in communication with battery 212, with battery 213, and with voltage regulator(s) 218 via power connector 215. In an embodiment, power connector 215 may be a system management bus, and it may also include low power pins to provide power to logic components in wireless charger module 209.

Voltage regulators 218 can provide multiple regulated voltages to different systems loads 220 of IHS 100, such as a CPU, a memory, a display device, and the like. Host/EC throttle control module 217 is in communication with NFC alternate BT LE antenna 216. Host/EC throttle control module 217 can be a hardware module, a software module, and/or any combination of a hardware and software module. For example, host/EC module 217 may be a power management integrated circuit, a power management unit, or the like. The plurality of DC sources 202 can include an automatic air source, an alternating current (AC)-to-DC source, and a universal serial bus (USB) power source, or the like.

When wireless charger module 209 is integrated or connected to IHS 100, wireless charger 211 can communicate with host/EC throttle control module 217 of IHS 100 to provide information about the wireless charger module. For example, information can include a class of the wireless charger module 209, an amount of power that the wireless charger module can provide, a type of the wireless charger module, and the like. Host/EC throttle control module 217 may use the information to detect whether wireless charger module 209 is compatible with a power system of IHS 100. When host/EC throttle control module 217 has determined that wireless charger module 209 is compatible with IHS 100, host/EC throttle control module 217 can set the power system of IHS 100 in a ready state to receive power from wireless charger module 209.

When IHS 100 containing wireless charger module 209 is placed within an NFC range of wireless charging pad 201, NFC product EDID tag 219 can transmit a presence signal, referred to as a chirp, to indicate that IHS 100 is within range of wireless charging pad 201. The presence signal may be a repeating pulse that can be received by antenna 208, which in turn can provide the presence signal to source-to-load limit control 205. In some implementations, a presence signal from NFC tag 219 may also include information about wireless charger module 209, such as a class of wireless charger module 209.

When source-to-load limit control module 205 receives the presence signal from antenna 208, it determines whether another signal is received from throttle control module 206. If a signal is not received from throttle control module 206, source-to-load limit control module 205 may set an operation level of wireless charging pad 201 to an initial operation level, such as a minimum level. Source-to-load limit control module 205 may send the operation level to wireless power source 203, which may receive power from one of DC power sources 206.

Wireless power source 203 may then provide power to Tx coil(s) 204, which in turn can wirelessly provide that power to Rx coil(s) 210 of wireless charger module 209. Wireless charging pad 201 may use one or more techniques to provide power wirelessly, including inductive techniques, resonant inductive techniques, capacitive transfer techniques, beamed power transfer, such as laser or microwave transfer, etc. In some embodiments, power is provided from Tx coil(s) 204 to Rx coil(s) 210 via inductive power transfer.

Rx coil(s) 210 may receive wireless power from Tx coil(s) 204 and may provide power to wireless charger 211. Wireless charger 211 may then convert power received from Rx coil(s) 210 to a power level and a voltage level that can be utilized by IHS 100, such as, for example, 45 or 65 Watts and 19.5 volts.

Wireless charger 211 may supply the converted power to battery 213 and/or voltage regulators 312. The power provided to battery 213 may be used to charge it, and power provided to voltage regulators 312 may be supplied at a proper voltage to the remaining components of IHS 100. If battery 213 is fully charged and IHS 100 does not require the entire amount of power received by wireless charger module 209 from wireless charging pad 201, wireless charger 211 may provide the remaining power to the battery 212. The power provided to battery 212 may be used to charge it, which can be used as a secondary battery for IHS 100.

Host/EC throttle control module 217 can receive information about the power provided by wireless charging pad 201 from wireless charger 211. The information can include whether wireless charging pad 201 is compatible with the wireless charger converter, a total amount of power that the wireless charging pad is able to provide, or the like. Host/EC throttle control module 217 can also determine information about IHS 100, such as a percentage of batteries 212 and 213 that is charged, an operation mode of IHS 100, and the like.

If host/EC throttle control module 217 determines that wireless charging pad 201 is not compatible with the class of wireless charger module 209, the host/EC throttle control module can set a flag to cause wireless charger 211 not to receive power from wireless charging pad 201. Host/EC throttle control module 217 can also notify the user that IHS 100 is not receiving power from wireless charging pad 201. If host/EC throttle control module 217 determines that wireless charging pad 201 is compatible with wireless charger module 209, host/EC throttle control module 217 can determine an amount of power that is available from wireless charging pad 201. If host/EC throttle control module 217 determines that the maximum amount of power available from wireless charging pad 201 is less than the amount needed to operate IHS 100 at maximum power, host/EC throttle control module may modify an operating mode of IHS 100, such as operating below the maximum power.

For example, host/EC throttle control module 217 can cause IHS 100 to enter a standby or low power mode in response to determining that the maximum amount of power available from wireless charging pad 201 is substantially less than the amount needed by the IHS. Host/EC throttle control module 217 may cause IHS 100 to remain in the low power mode while battery 213 is charged to a high enough capacity to operate IHS 100. In another embodiment, host/EC throttle control module 217 may reduce the operational mode of IHS 100, such that the voltage supplied to the central processing unit, the memory, and other components of IHS 100 is reduced.

If host/EC throttle control module 217 determines that wireless charging pad 201 can provide more power than needed by IHS 100 for maximum operation power, host/EC throttle control module 217 may determine a power state needed for IHS 100 and may send the power state to throttle control module 206. When throttle control module 206 receives the power state from host/EC throttle control module 217, throttle control module 217 can determine an operation level for wireless charging pad 201. Throttle control module 206 may then send the operation level to source-to-load limit control module 205, which in turn can determine an amount of power to be provided by wireless power source 203. Source-to-load limit control module 205 may send a signal to wireless power source 203 to set the power level for the wireless power source to provide to IHS 100 via Tx coil(s) 204.

Wireless charger 211 may receive power from Rx coil(s) 210 and it may provide the power to the battery 212, voltage regulator(s) 218, and/or battery 213. While wireless charger module 209 is receiving power from wireless charging pad 201, host/EC throttle control module 217 may continually monitor the operational mode of IHS 100 and adjust the power state provided to throttle control module 206. For example, IHS 100 may operate in a maximum power mode, and may switch to a low power mode such that IHS 100 does not need the same amount of power.

The power state can indicate the amount of power to be provided to wireless charger module 209 connected IHS 100. In this situation, host/EC throttle control module 217 may determine a new power state and send the new power state to throttle control module 206, which in turn can adjust the operation level of wireless charging pad 201. The change in the operation level of wireless charging pad 201 may result in a change in the amount of power provided to IHS 100.

If wireless charging pad 201 cannot provide the amount of power requested by Host/EC throttle control module 217 or any amount of power to IHS 100, the wireless charging pad can send information to host/EC throttle control module 217 to indicate the current power available. Host/EC throttle control module 217 can then set a flag to indicate that a certain amount of power cannot be received from wireless charging pad 201. Host/EC throttle control module 217 may also set a flag when battery 213 is fully charged, and another flag when battery 320 is fully charged. Host/EC throttle control module 217 may then send information to throttle control module 206 to indicate that IHS 100 does not currently need power from wireless charging pad 201.

When IHS 100 and wireless charger module 209 are no longer in communication with wireless charging pad 201, host/EC throttle control module 217 can clear any flags set. Thus, if IHS 100 begins to communicate with wireless charging pad 201 again, the communication and setup between host/EC throttle control module 217 and throttle control module 206 can restart as described above. In another embodiment, when IHS 100 is no longer in communication with wireless charging pad 201, host/EC throttle control module 217 can continue to maintain flags indicating that batteries 212 and 213 are fully charged until a point in time, if any, that one or both batteries become(s) less than fully charged.

High efficiency wireless charging creates limits on alignment between the transmitter and receiver coil(s) 204 and 210, respectively. Coil(s) alignment and freedom of placement play a role in cost, ease of charging and power limits. In some situations, charging will not engage as wireless charging pad 201 shuts off due to the placement of IHS 100 not meeting full power delivery specifications; in which case all power ordinarily stops being delivered.

Figure 3:
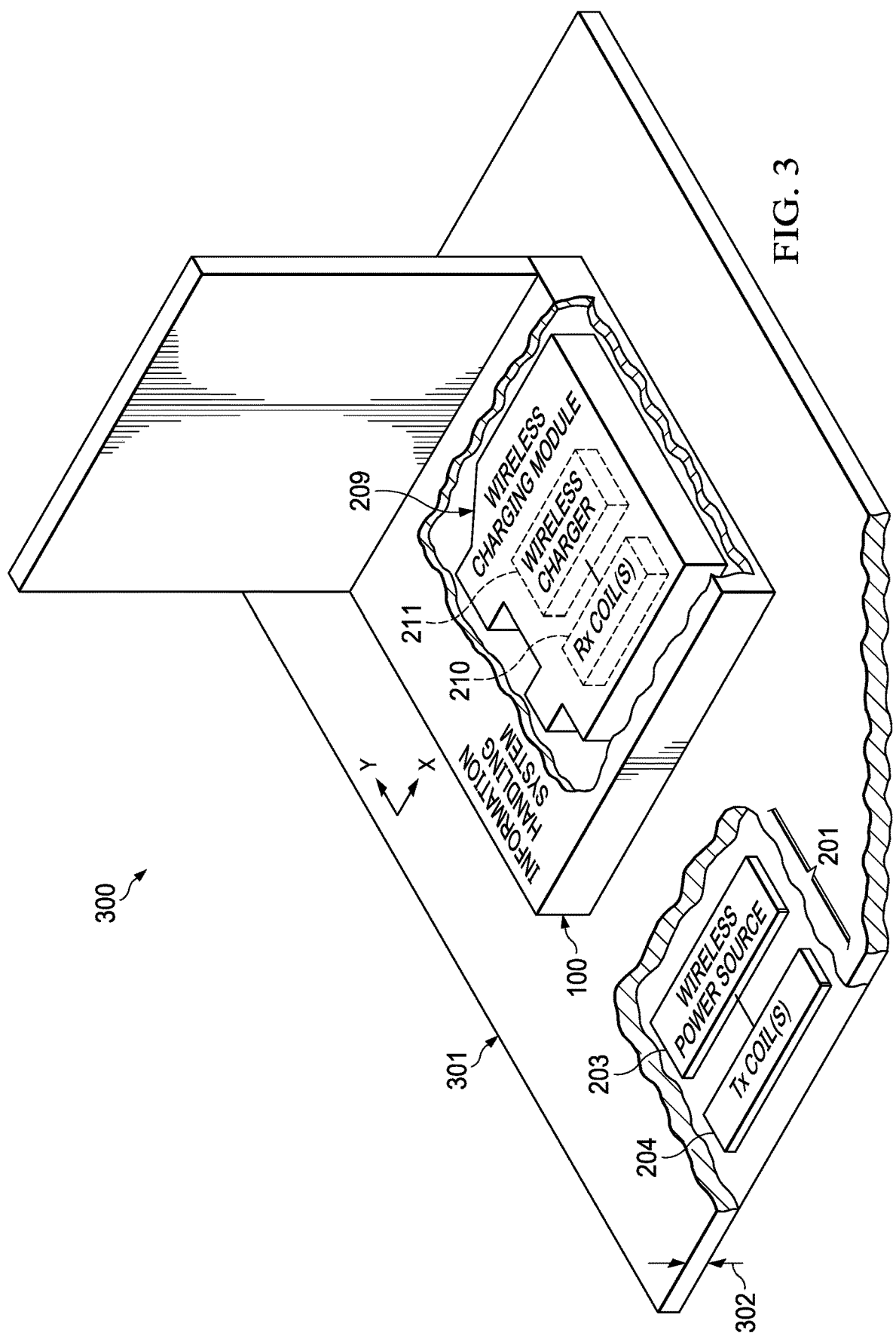
FIG. 3 is a diagram of an example of an IHS and a wireless charging pad disposed with respect to a work surface, according to some embodiments.

FIG. 3 is a diagram of example 300 of IHS 100 and wireless charging pad 201 disposed with respect to work surface 301 of thickness 302. Wireless charging pad 201 includes wireless power source 203 and Tx coil(s) 204 (which may be located near the center of charging pad 201 but is shown here near the edge for illustration purposes only). IHS 100 includes wireless charging module 209 having Rx coil(s) 210 and wireless charger 211.

In some cases, wireless charging module 209 may be integrated into IHS 100. In other cases, wireless charging module 209 may be shaped to fit within a standard optical drive bay of IHS 100. For example, wireless charging module 209 can connect with IHS 100 via serial advanced technology attachment (SATA) mini-bus or the like. When wireless charging module 209 is connected to IHS 100, wireless charger 211 may communicate with IHS 100 to provide information about wireless charging module 209. For example, information may include a class of the wireless charging module 209, an amount of power that the wireless charging module can provide, a type of the wireless charging module, a maximum amount of voltage that the wireless charging module can provide, and the like. IHS 100 may use that information to detect whether wireless charging module 209 is compatible with a power system of IHS 100. When IHS 100 has determined that wireless charging module 209 is a compatible charging module, the IHS can send the power system in a ready state to receive power from the wireless charging module.

Wireless charging pad 201 may detect when a device such as IHS 100 is placed on top of it, and it may transmit a detect signal in response to detecting the IHS. IHS 100 may receive the detect signal from wireless charging pad 201 it and may respond by transmitting a presence signal. The presence signal may include a repeating pulse signal, referred to as a chirp, and may also include information associated with IHS 100 and wireless charging module 209, such as a class of IHS and the class of the wireless charging module. The class of IHS 100 and the class of wireless charging module 209 can indicate a maximum power needed for IHS 100, or the like.

For electromagnetic power to flow from Tx coil(s) 204 to Rx coil(s) 210, there must be a minimum degree of vertical alignment between them. As such, after the user positions IHS 100 atop work surface 301, the user moves IHS 100 in the x-y directions until Tx coil(s) 204 and Rx coil(s) 210 are sufficiently aligned. However, work surface 301 is typically made of metal, wood, plastic, or other opaque material. Because the user cannot see the position of Tx coil(s) 204 (because it is located under work surface 301) nor Rx coil(s) 210 (because it is disposed within IHS's chassis), the alignment process can be cumbersome.

Figure 4A:
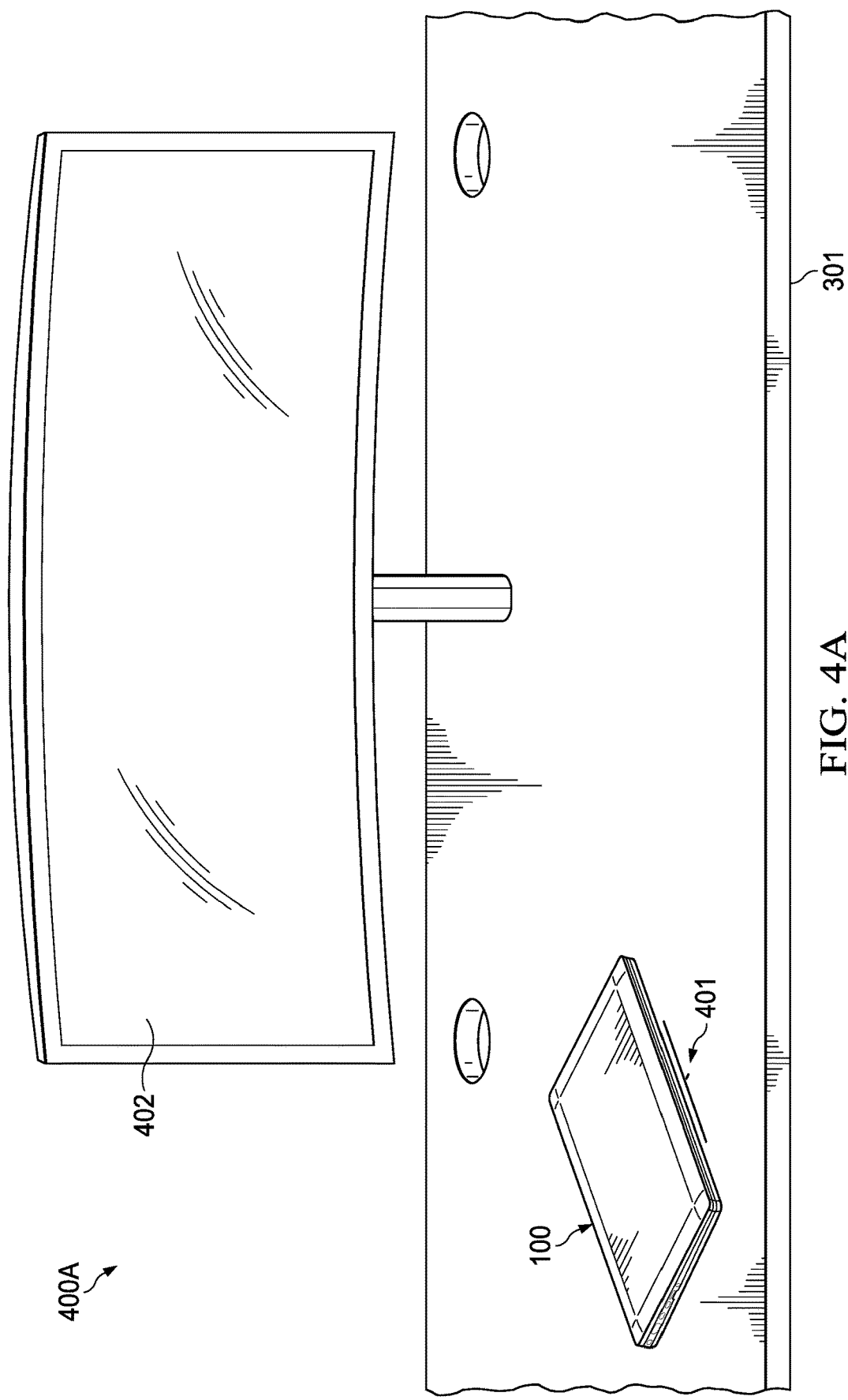
FIGS. 4A-C are diagrams of an example of a workstation with a wireless charging alignment system, according to some embodiments.
Figure 4B:
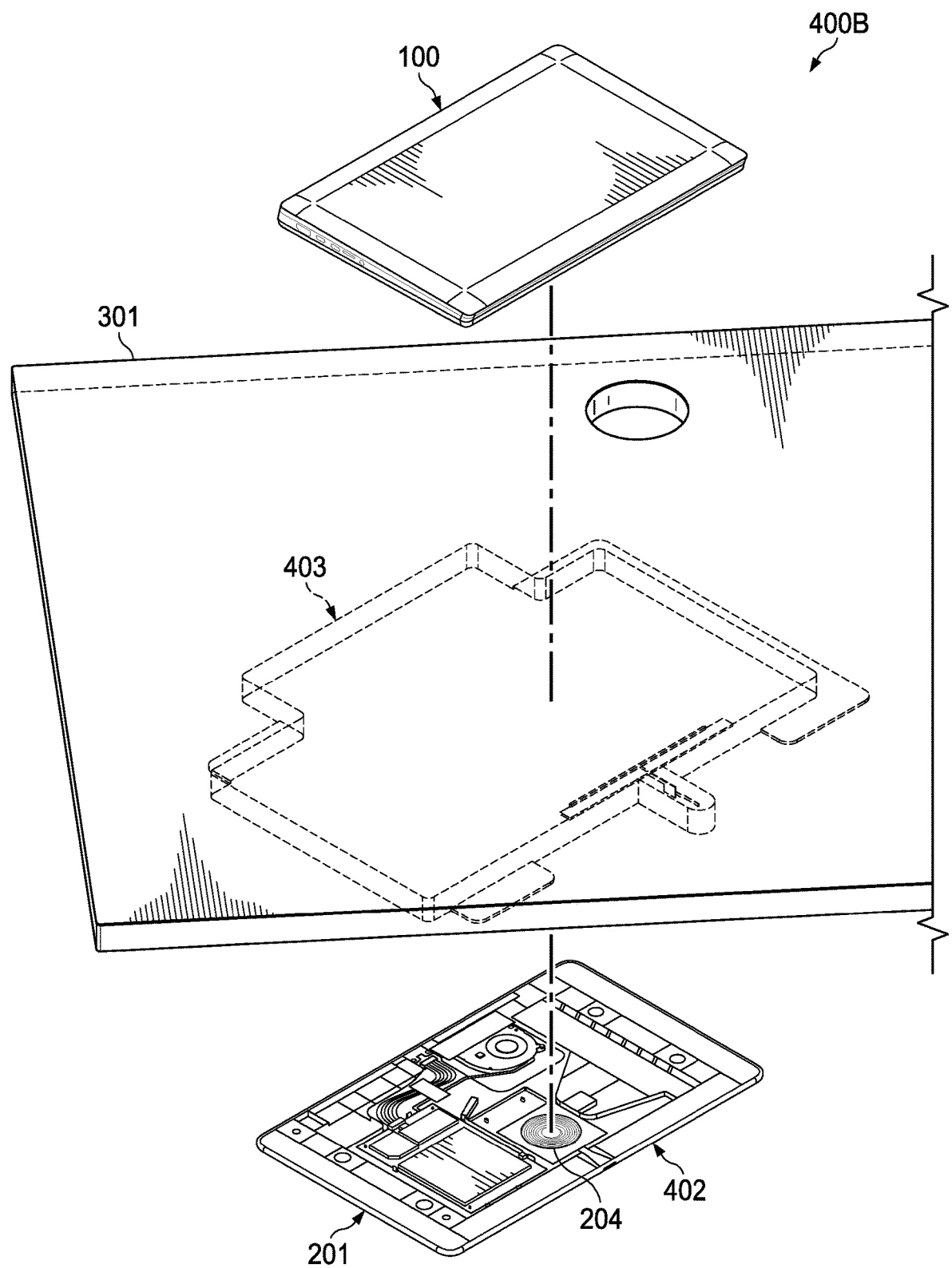
Figure 4C:
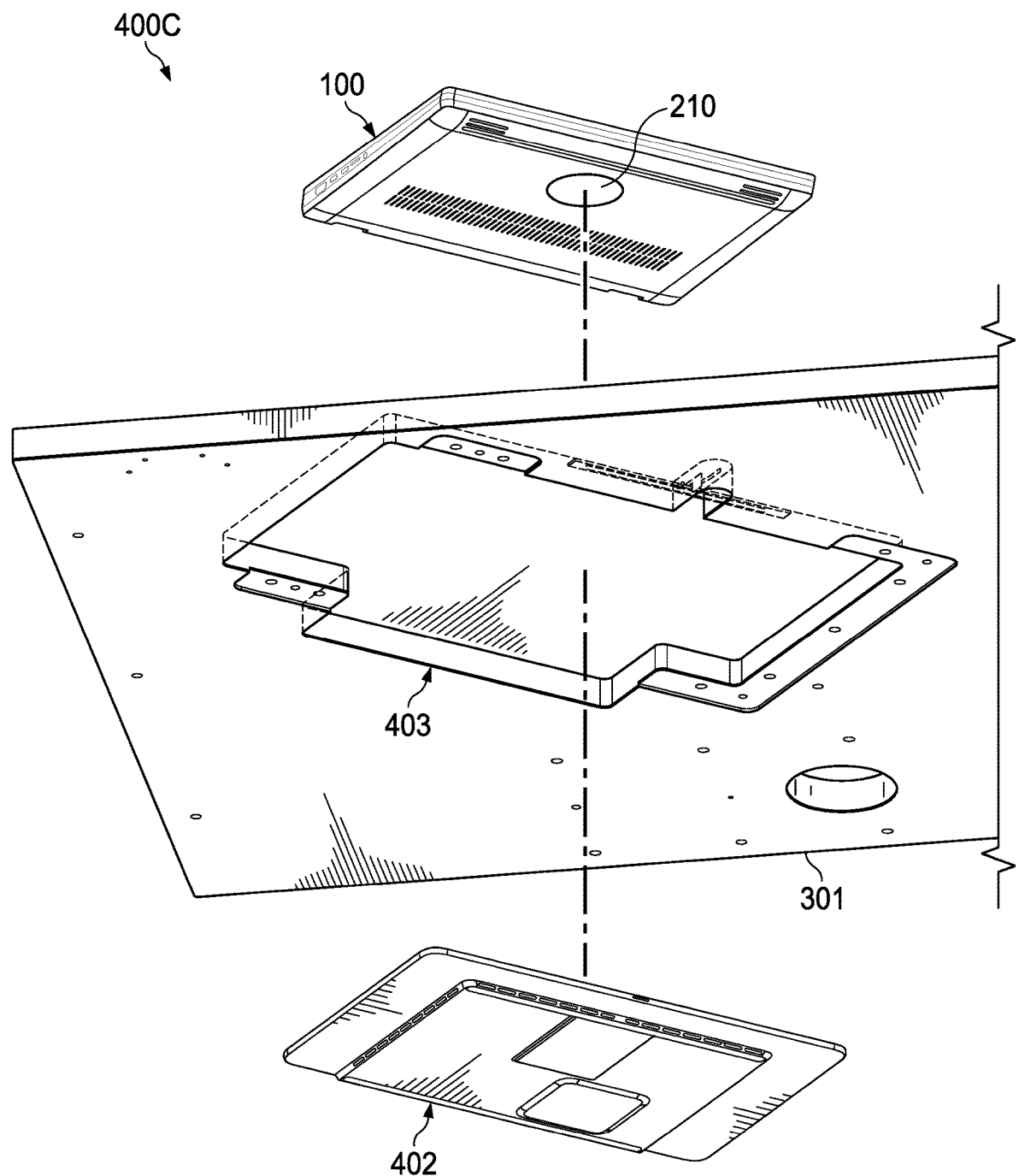

To address these, and other issues, FIGS. 4A-C show diagrams 400A-C, respectively, of an example of a workstation with a wireless charging alignment system. Particularly, in workspace 400A of FIG. 4A, work surface 301 may be part of a desk or table that includes external display 402. IHS 100 sits atop work surface 301 and it is aligned with respect to wireless charging pad 201 (not shown) mounted on the underside of work surface 301. Work surface 301 includes alignment features 401 of a wireless charging alignment system, discussed in more detail below.

FIG. 4B shows IHS 100 over work surface 301, viewed from above. Work surface 301 includes cavity 403 configured to receive wireless charging pad 201 having Tx coil(s) 204. In some cases, wireless charging pad 201 may be held within cavity 403 using mounting plate or shield 402. FIG. 4C shows IHS 100 with Rx coil(s) 210 above work surface 301, viewed from below. Again, wireless charging pad 201 may be held within cavity 403 by mounting plate 402.

Figure 5:
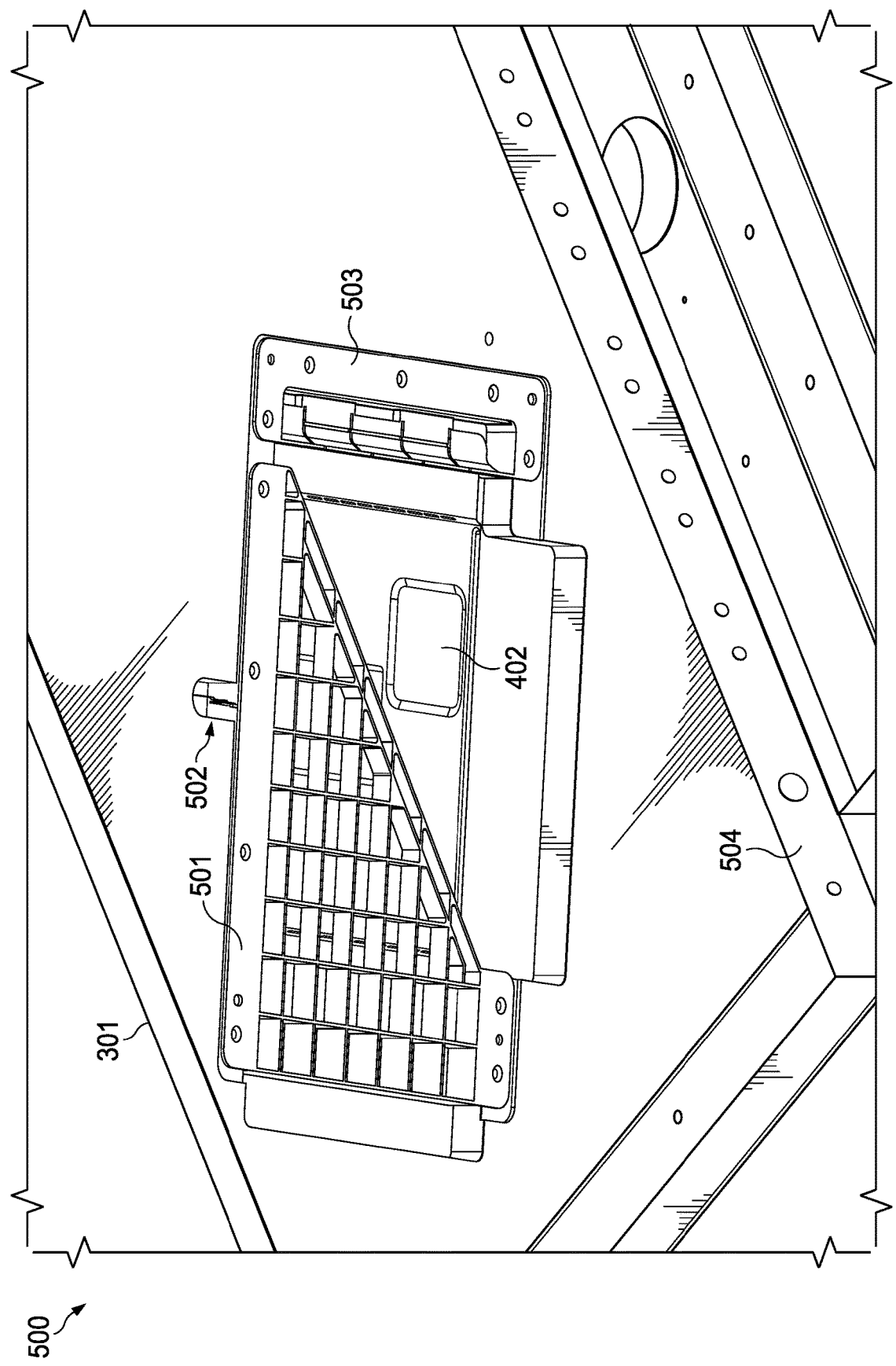
FIG. 5 is a diagram of an example of a wireless charging pad support structure, according to some embodiments.

FIG. 5 is a diagram of an example of a wireless charging pad support structure. In some cases, support structure 501 may be fasted to the underside of work surface 301 to hold mounting plate 402. Support structure 501 may include plastic piece with a honeycomb-type features to facilitate airflow. Moreover, support structure 501 may have a generally triangular shape to accommodate frame 504 under work surface 301. In some cases, pivoting bracket 503 may be used to rotate in the x-axis and hold wireless charging pad 201 and mounting plate 402 in place. In some cases, notch or slot 502 may be fabricated under work surface 301 to accommodate an LED assembly (e.g., under a transparent or translucent window) such that light is visible to the user through otherwise opaque work surface 301.

Figure 6A:
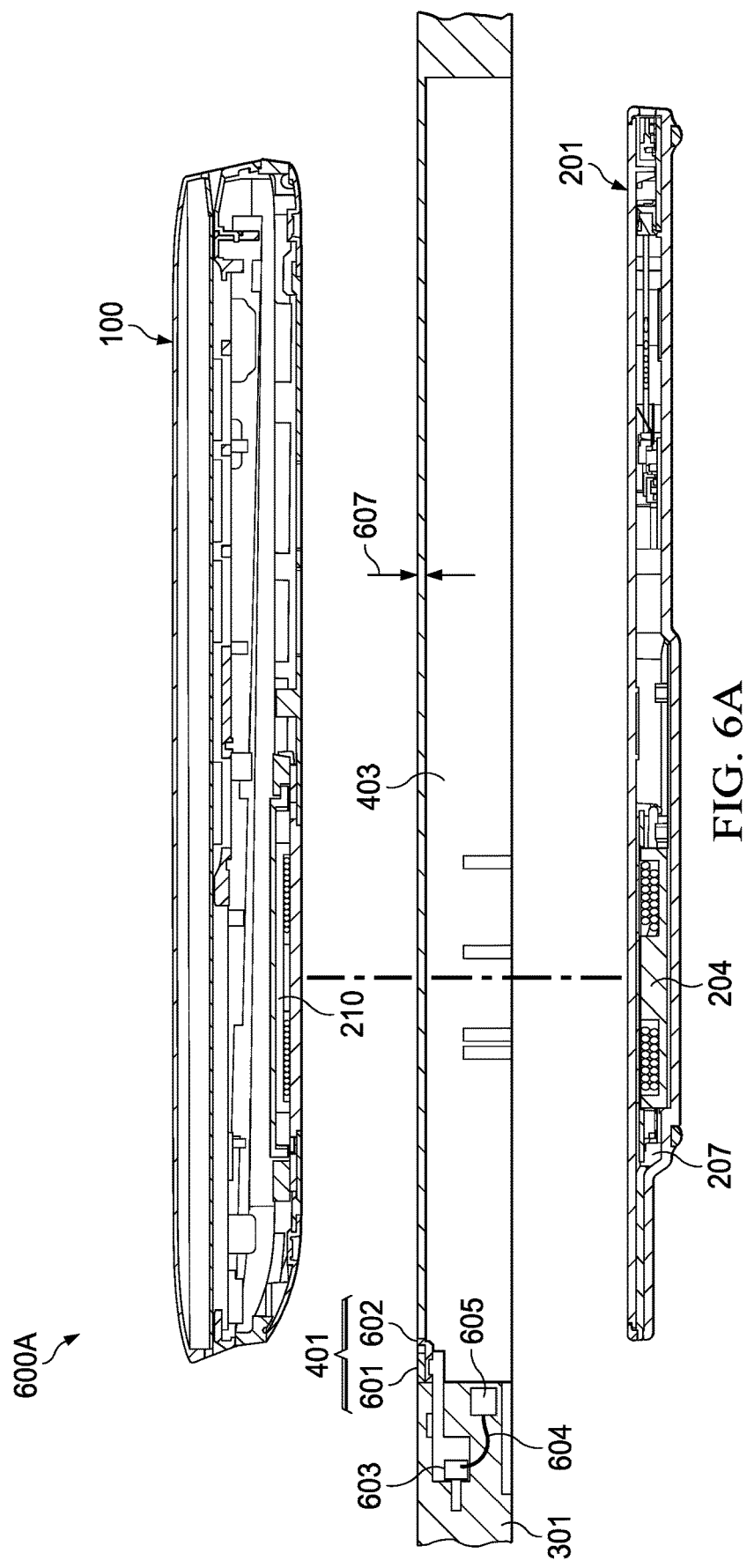

FIGS. 6A and 6B are diagrams 600A and 600B of an example of a wireless charging alignment system. Particularly, diagram 600A of FIG. 6A depicts unassembled workspace components where two alignment features 401 are shown. Alignment bar 602 is mounted on work surface 301 (of thickness 607), whereas light source 602 (e.g., an LED) is mounted on Printed Circuit Board (PCB) 603. Light indicator 601 is coupled via wire 604 to connector 605 disposed in proximity to cavity 403. Wireless charging pad 201 includes GPIO pin 207 configured to provide signals indicative of a charging status of IHS 100, which in turn depends upon the proper alignment between Tx coil(s) 204 and Rx coil(s) 210.

Diagram 600B of FIG. 6B shows assembled workspace components with connector 605 coupled to GPIO pin 207 via wire 606. When the leading edge of IHS 100 is aligned with alignment bar 602, Tx coil(s) 204 and Rx coil(s) 210 are aligned along the y axis. In some cases, alignment bar 602 may comprise a piece of metal the protrudes from work surface 301 and is configured to catch the leading edge of IHS 100 as it slides from the rear of work surface 301 to the front nearest the user.

Figure 7A:
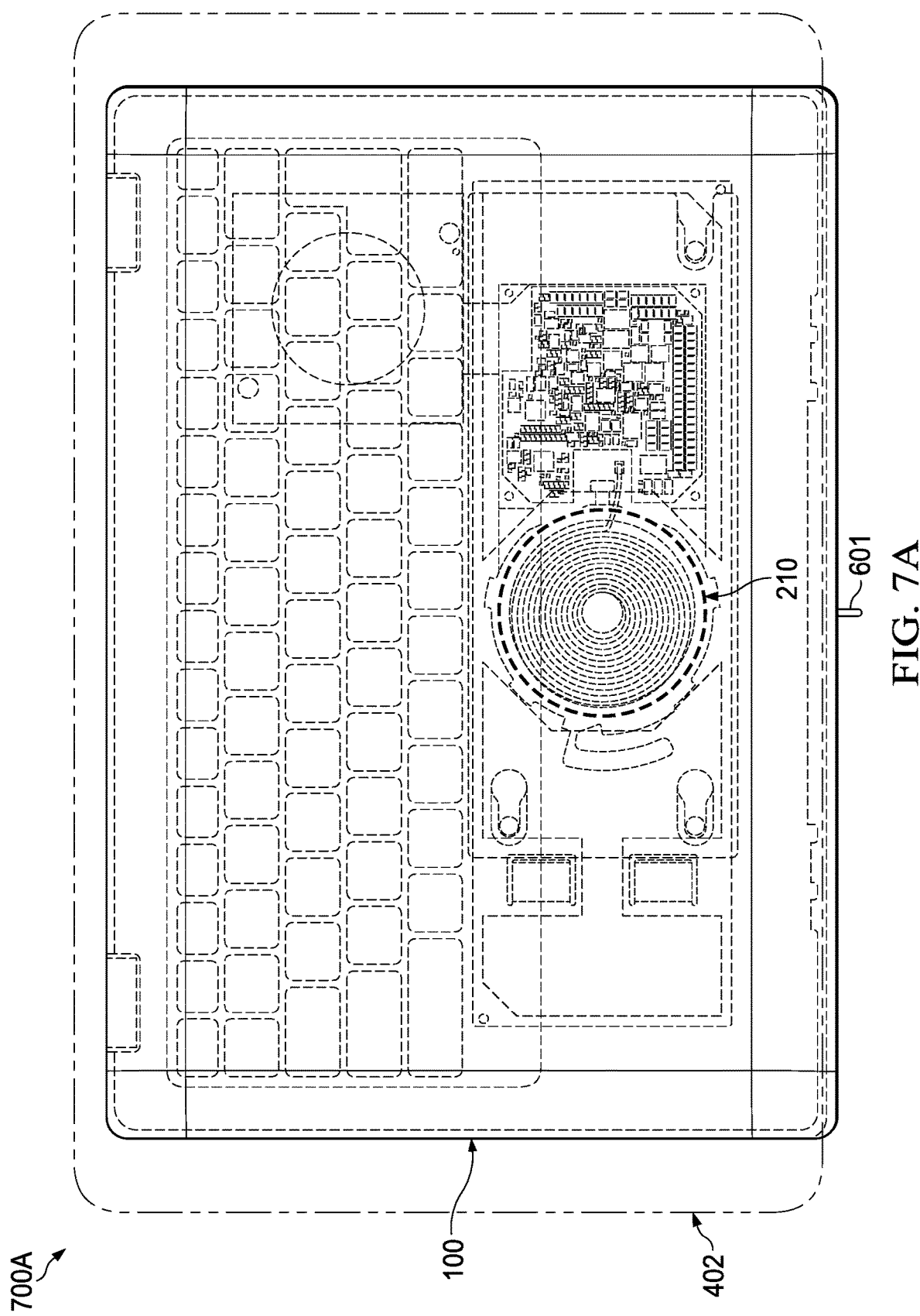
FIGS. 7A and 7B are diagrams of examples of charging coil(s), according to some embodiments.
Figure 7B:
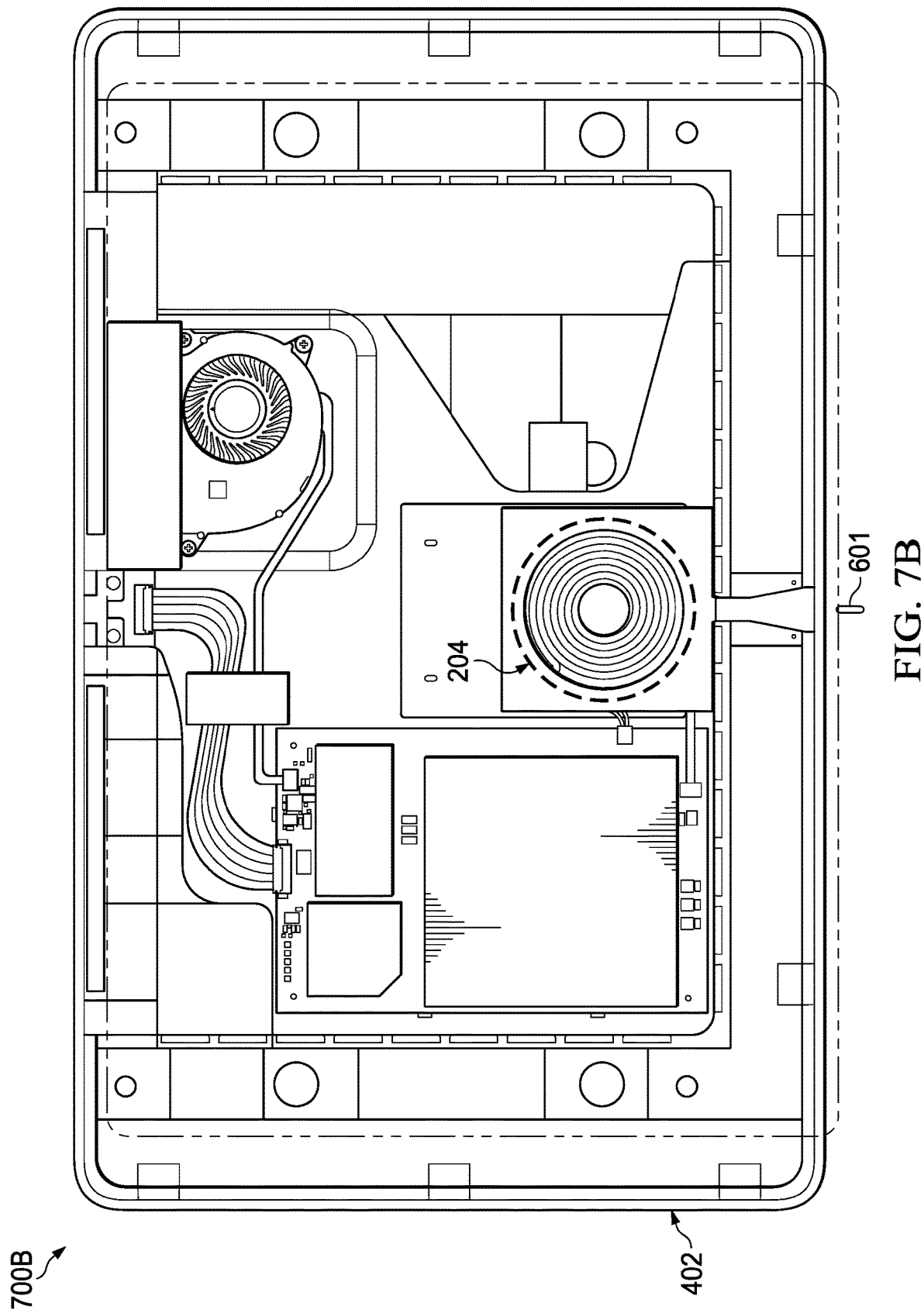

FIGS. 7A and 7B are diagrams 700A and 700B of examples of charging coil(s) 210 of IHS 100 and 204 of wireless charging pad 201, from the top and bottom of work surface 301, respectively. Light indicator 601 may be used to indicate when Tx coil(s) 204 and Rx coil(s) 210 are aligned along the x axis. In some implementations, light indicator 601 and/or slot 502 may have a line segment shape that is perpendicular to alignment bar 602.

Figure 8A:
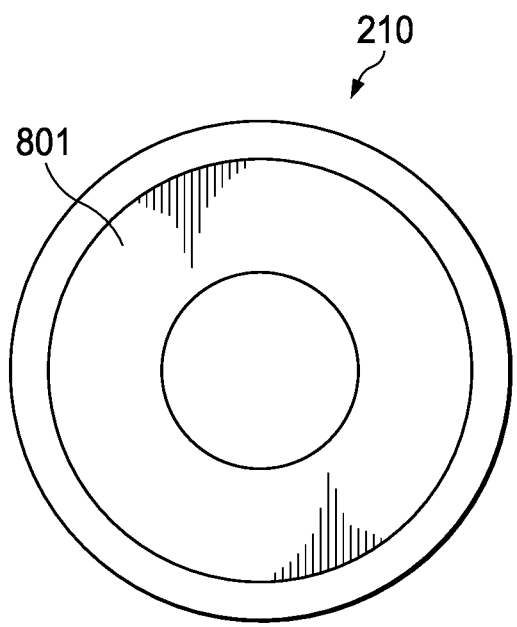
FIGS. 8A and 8B are diagrams of examples of a single-coil receiver and a dual-coil transmitter, according to some embodiments.
Figure 8B:
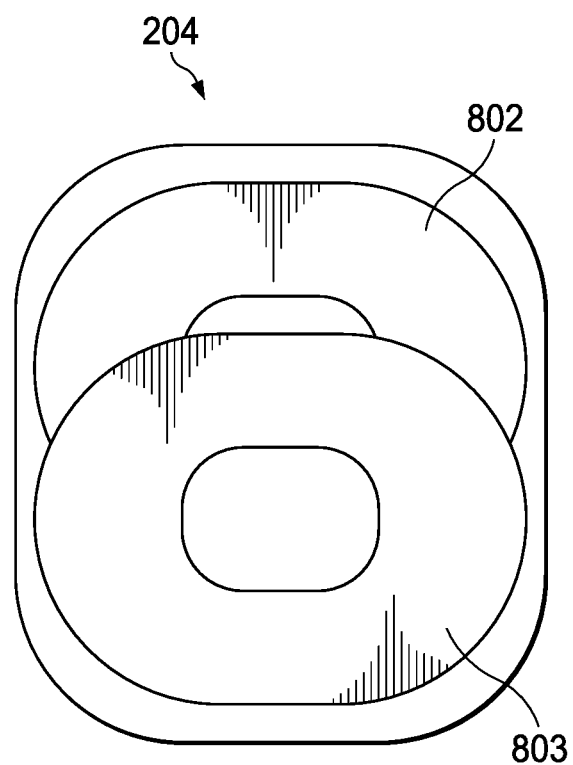

FIGS. 8A and 8B are diagrams 800A and 800B of examples of single-coil 801 receiver 210 within IHS 100 and dual-coil 802/803 transmitter 204 within wireless charging pad 201. In some cases, dual coil 802/803 transmitter 204 may be configured to accommodate different models or form-factor IHSs 100 with single-coil 801 receiver 210 positioned at different distances from the IHS's leading edge. Moreover, each of coils 802 and 803 may have a racetrack shape to further increase the alignment tolerance with respect to coil 801.

Figure 9A:
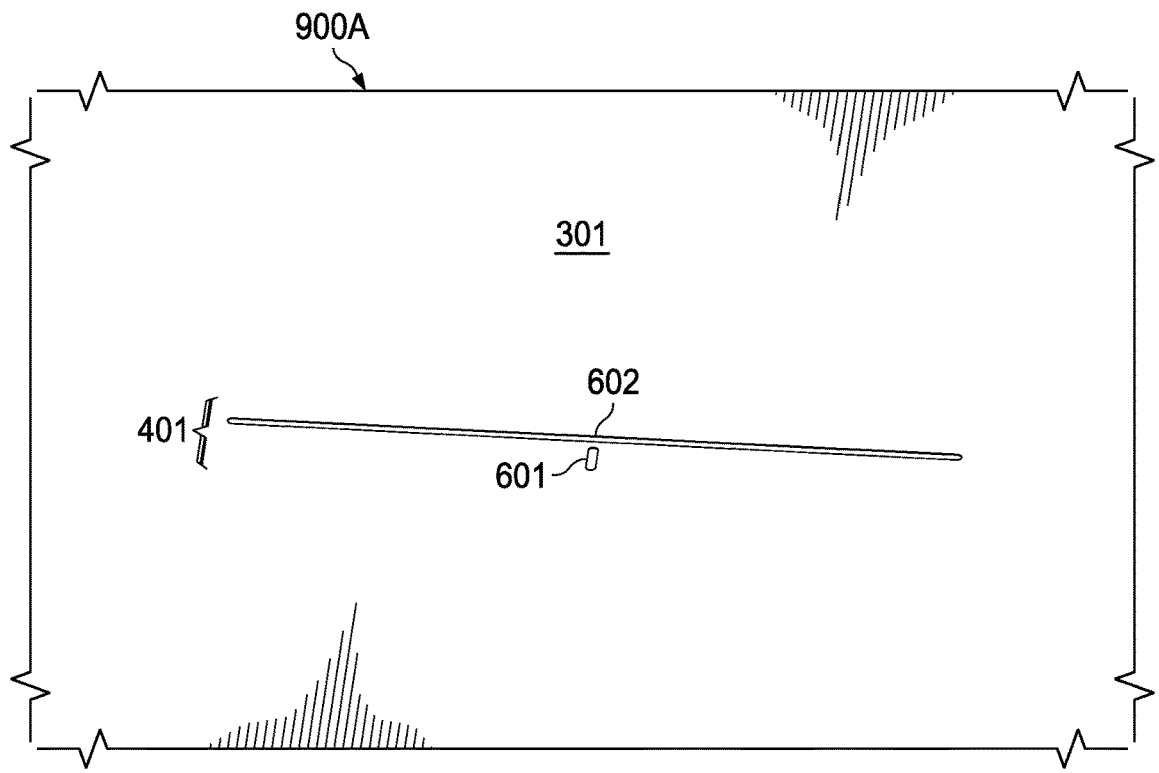
FIGS. 9A and 9B are diagrams of examples of alignment features of a wireless charging alignment system, according to some embodiments.
Figure 9B:
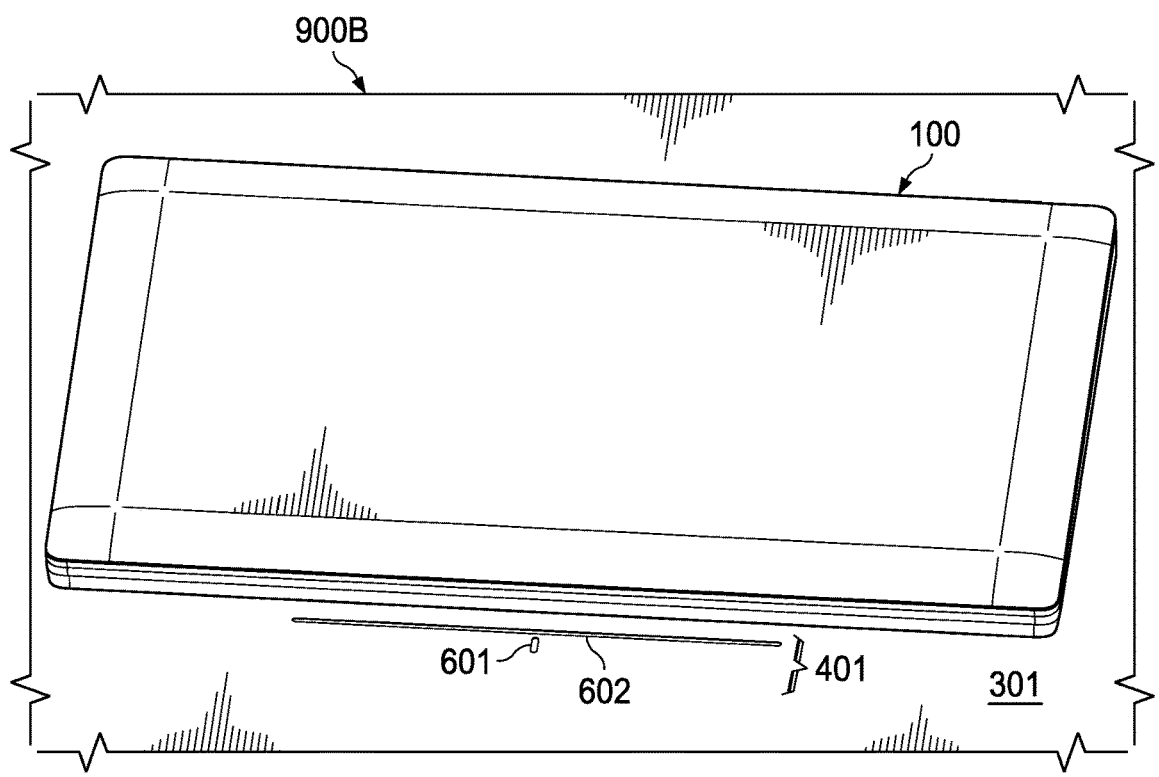

FIGS. 9A and 9B are diagrams 900A and 900B of examples of alignment features 401 of a wireless charging alignment system. In diagram 900A, protruding alignment bar 602 is perpendicular with respect to light indictor 601, and it is at an angle (e.g., 0-45°) with respect to the edge of work surface 301. In this case, IHS 100 is absent, therefore light indicator 601 is turned off. In diagram 900B, the leading edge of IHS 100 meets alignment bar 602. When IHS 100 is also positioned with its center matching light indicator 601 in the x direction such that Tx coil(s) 204 and Rx coil(s) 210 are aligned, light indicator 601 is turned on.

Figure 10A:
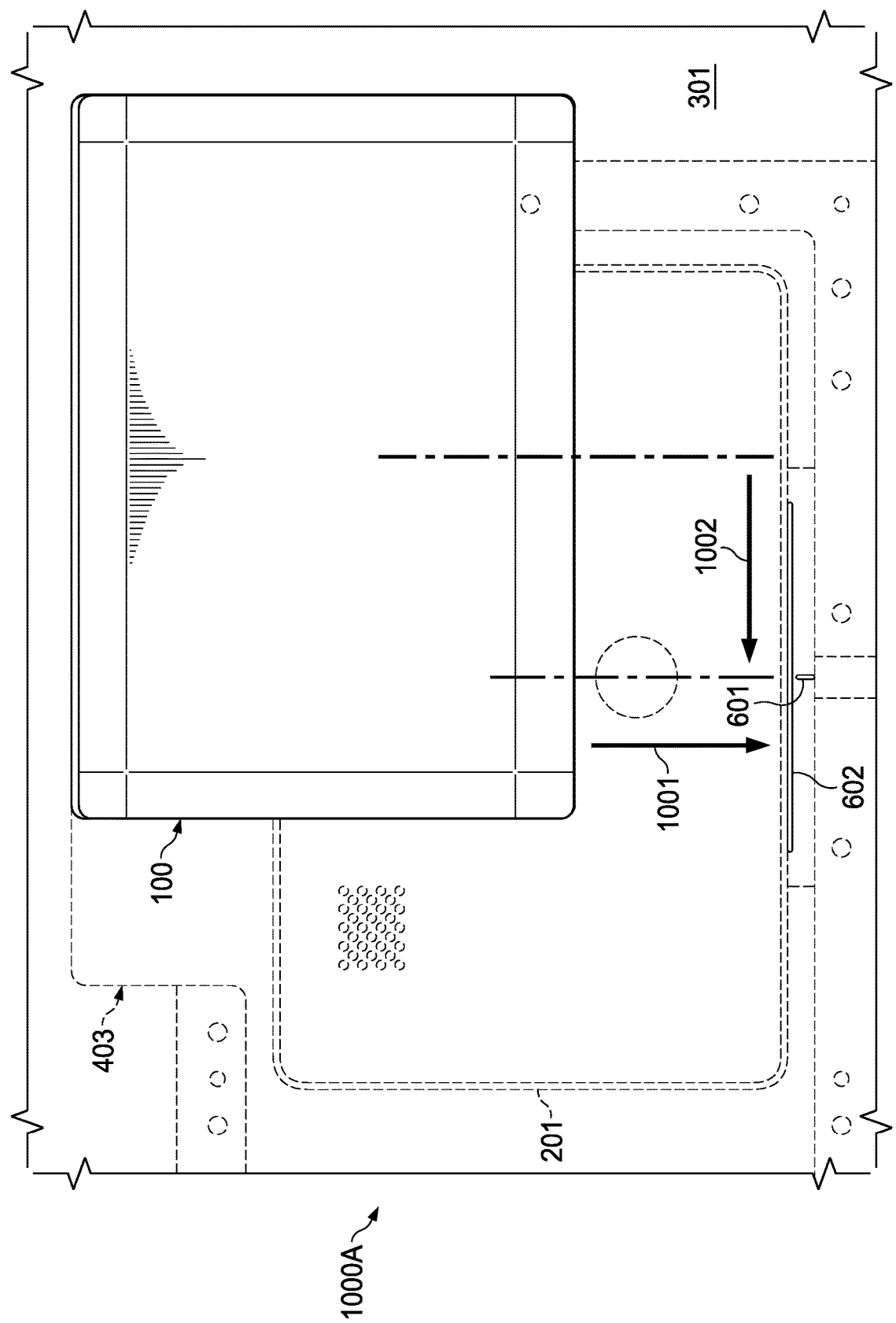
FIGS. 10A and 10B are diagrams of an example of a method for aligning an electronic device with respect to a wireless charging pad disposed under a work surface, according to some embodiments.
Figure 10B:
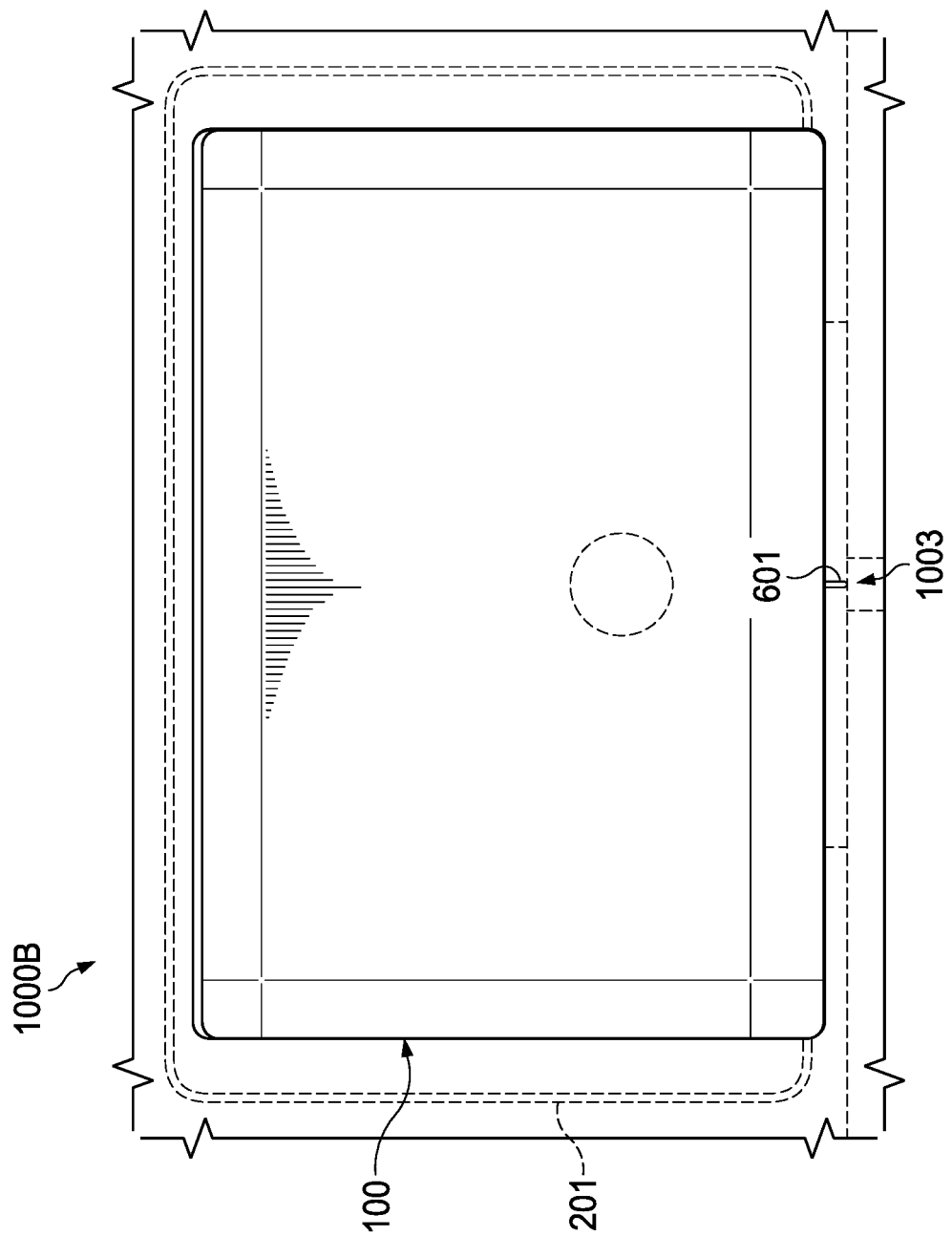

FIGS. 10A and 10B are diagrams illustrating an example of a method for aligning IHS 100 (or another electronic device) with respect to wireless charging pad 201 disposed under work surface 301. In diagram 1000A, the leading edge of IHS 100 is initially at first distance 1001 in they direction from alignment bar 602, and the center of IHS 100 is at second distance 1002 in the x direction from light indicator 601, such that IHS 100 is misaligned with respect to wireless charging pad 201.

In diagram 1000B, the user slides the leading edge of IHS 100 toward alignment bar 602 (as IHS 100 is moved toward an edge of work surface 301 nearest the user) so that Tx coil(s) 204 and Rx coil(s) 210 are aligned in the y direction. Then, the user moves IHS 100 sideways along alignment bar 602 until the center of IHS 100 is aligned with light indicator 601, so that Tx coil(s) 204 and Rx coil(s) 210 are also aligned in the x direction, and light indicator 601 emits light 1003.

In various implementations, light indicator 601 may be configured to provide a first visual indication (e.g., a first color) in response to IHS 100 being aligned with respect to wireless charging pad 201 and Rx coil(s) 210 being positioned relative to Tx coil(s) 204 of wireless charging pad 201 such that electromagnetic energy is transferred between them. A logic circuit within wireless charging pad may provide signals via GPIO port 207 that cause light indicator 601 to illuminate. Alternatively, the logic circuit may be mounted on PCB 603.

Additionally, or alternatively, light indicator 601 provide a second visual indication (e.g., a second color) to the user that IHS 100 is misaligned with respect to wireless charging pad 201 such that electromagnetic energy is not transferred between Tx coil(s) 204 and Rx coil(s) 210. Additionally, or alternatively, light indicator 601 may provide a third visual indication (e.g., a third color) to the user that the wireless charging pad is coupled to a power supply. Additionally, or alternatively, light indicator 601 provide another visual indication (e.g., a fourth color, blinking, etc.) to the user of a problem or error.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system, comprising:
   a printed circuit board (PCB);
   a light indicator coupled to the PCB, wherein the light indicator is configured to connect to a wireless charging pad disposed under a work surface, and wherein light emitted by the light indicator is visible to a user from above the work surface; and
   a protruding alignment bar configured to facilitate alignment of an electronic device atop the work surface with respect to the wireless charging pad in a first direction, wherein the light indicator is configured to provide a first visual indication comprising a first color indicating to the user that the electronic device is aligned with respect to the wireless charging pad in a second direction perpendicular to the first direction, and wherein the light indicator is configured to provide a second visual indication comprising a second color indicating to the user that the electronic device is misaligned with respect to the wireless charging pad in the second direction.

2. The system of claim 1, wherein in the light indicator comprises a Light Emitting Diode (LED).

3. The system of claim 1, wherein the light indicator is configured to connect to a General-Purpose Input/Output (GPIO) pin of the wireless charging pad.

4. The system of claim 1, wherein the work surface is part of a desk or table.

5. The system of claim 4, wherein the work surface is opaque, and wherein the light is visible through a slot on the work surface.

6. The system of claim 4, wherein the wireless charging pad is mounted onto the desk or table using a support piece coupled to an underside of the work surface.

7. The system of claim 1, wherein the protruding alignment bar is configured to catch a leading edge of the electronic device in response to the electronic device being moved toward an edge of the work surface nearest the user.

8. The system of claim 7, wherein the first direction is at an angle between 0 and 45° with respect to the edge.

9. The system of claim 1, wherein the electronic device is aligned with respect to the wireless charging pad when a receive (Rx) coil(s) of the electronic device is positioned relative to a transmit (Tx) coil(s) of the wireless charging pad and electromagnetic energy is transferred between the Tx and Rx coil(s).

10. The system of claim 9, wherein the Tx coil(s) comprises two or more coil(s) separated by a distance in the first direction.

11. The system of claim 10, wherein each of the two or more coil(s) comprises a racetrack shape.

12. The system of claim 1, wherein the light indicator is configured to provide a fourth visual indication to the user, the fourth visual indication comprising at least one of: a fourth color, or blinking.

13. The system of claim 12, wherein the light indicator is configured to provide a third visual indication comprising a third color indicating to the user that the wireless charging pad is coupled to a power supply.

14. The system of claim 12, wherein the light indicator is configured to provide a visual indication to the user of a problem or error.

15. A table or desk, comprising:
   a wireless charger coupled to a bottom side of a work surface of the table or desk; and
   an alignment system comprising: (a) an alignment bar configured to facilitate alignment of an electronic device above the work surface with respect to the wireless charger in a first direction; and (b) a light indicator configured to provide a first visual indication comprising a first color indicating to a user that the electronic device is aligned with respect to the wireless charger in a second direction perpendicular to the first direction, wherein the light indicator is configured to provide a second visual indication comprising a second color indicating to the user that the electronic device is misaligned with respect to the wireless charger in the second direction.

16. The table or desk of claim 15, wherein the electronic device is aligned with respect to the wireless charger when a receive (Rx) coil(s) of the electronic device is electromagnetically coupled to a transmit (Tx) coil(s) of the wireless charger.

17. A method, comprising:
   providing a visual indication comprising a first color indicating an electronic device is not properly aligned with respect to an induction mat in a first direction using a light indicator, wherein the electronic device is coupled to the induction mat via an alignment bar configured to facilitate alignment of the electronic device with respect to the induction mat in a second direction perpendicular to the first direction; and
   providing another visual indication comprising a second color indicating the electronic device is aligned with respect to the induction mat via the light indicator, wherein the induction mat is coupled to a bottom side of a work surface, and wherein the light indicator is visible from a top side of the work surface.

18. The method of claim 17, wherein the electronic device is aligned with respect to the induction mat when a receive (Rx) coil(s) of the electronic device is electromagnetically coupled to a transmit (Tx) coil(s) of the induction mat.

* * * * *

UNITED STATES PATENT AND TRADEMARK OFFICE
CERTIFICATE OF CORRECTION

| | | |
|---|---|---|
| PATENT NO. | : 12,401,236 B2 | Page 1 of 1 |
| APPLICATION NO. | : 17/645761 | |
| DATED | : August 26, 2025 | |
| INVENTOR(S) | : Andrew Thomas Sultenfuss et al. | |

It is certified that error appears in the above-identified patent and that said Letters Patent is hereby corrected as shown below:

In the Claims

In Column 15, Line 19, Claim 1, delete "first visual indication comprising a first color indicating" and insert -- first visual indication comprising a first color indication -- therefor.

In Column 15, Line 24, Claim 1, delete "indication comprising a second color indicating to the" and insert -- indication comprising a second color indication to the -- therefor.

In Column 16, Line 7, Claim 13, delete "third color indicating to the user that the wireless charging" and insert -- third color indication to the user that the wireless charging -- therefor.

In Column 16, Line 20, Claim 15, delete "comprising a first color indicating to a user that the" and insert -- comprising a first color indication to a user that the -- therefor.

In Column 16, Line 25, Claim 15, delete "color indicating to the user that the electronic device is" and insert -- color indication to the user that the electronic device is -- therefor.

In Column 16, Line 35, Claim 17, delete "indicating an electronic device is not properly aligned" and insert -- indication that an electronic device is not properly aligned -- therefor.

In Column 16, Line 43, Claim 17, delete "color indicating the electronic device is aligned with" and insert -- color indication that the electronic device is aligned with -- therefor.

Signed and Sealed this
Twenty-third Day of September, 2025

John A. Squires
*Director of the United States Patent and Trademark Office*